United States Patent [19]

Beckstrom

[11] Patent Number: 5,361,798
[45] Date of Patent: Nov. 8, 1994

[54] REMOTE PROPANE DISTRIBUTION POLE WITH HEIGHT ADJUSTABILITY

[76] Inventor: Kent A. Beckstrom, 4825 Sharon La., White Bear Lake, Minn. 55110

[21] Appl. No.: 185,369
[22] Filed: Jan. 24, 1994
[51] Int. Cl.⁵ ............................................. F16L 3/00
[52] U.S. Cl. ................................. 137/343; 248/146
[58] Field of Search ............... 137/343; 248/146, 125, 248/129, 313

[56] References Cited

U.S. PATENT DOCUMENTS

| | | | |
|---|---|---|---|
| 2,490,839 | 12/1949 | Shaffer et al. | 137/343 |
| 3,791,403 | 2/1974 | Folkerth | 137/343 |
| 4,944,292 | 7/1990 | Gaeke et al. | 137/343 |
| 5,038,819 | 8/1991 | Sutphen | 137/343 |

FOREIGN PATENT DOCUMENTS 1162056  9/1958  France ............................... 137/343

*Primary Examiner*—A. Michael Chambers
*Attorney, Agent, or Firm*—Thomas B. Tate

[57] ABSTRACT

A propane distribution pole for distributing propane to a heating appliance from a propane tank at a remote location. The distribution pole comprises a base which has a threaded coupling, a pipe which has its bottom end sealed by a threaded plug which fits into the threaded coupling on the base, and means for connecting the pipe to the propane tank and the heating appliance. The height of the distribution pole is adjustable by adding couplings.

3 Claims, 2 Drawing Sheets

REMOTE PROPANE DISTRIBUTION POLE WITH HEIGHT ADJUSTABILITY

SUMMARY AND BACKGROUND OF THE INVENTION

Ice fishermen usually heat their fishing houses by means of an infrared burner or portable camping stove of the type manufactured by Coleman. The stove burner is connected to a distribution pole which has a propane bottle mounted on top. The main problem with this arrangement is the danger of propane leakage.

The present invention solves this problem by providing a propane distribution pole which is mounted on a base and which has hose connections to the stove or burner, and also has hose connections to a propane tank which is located outside the fishing house. The pole has a sealed plug at the bottom where it fits into the base, and thus propane leakage is avoided.

DESCRIPTION OF THE INVENTION

Figure 1:
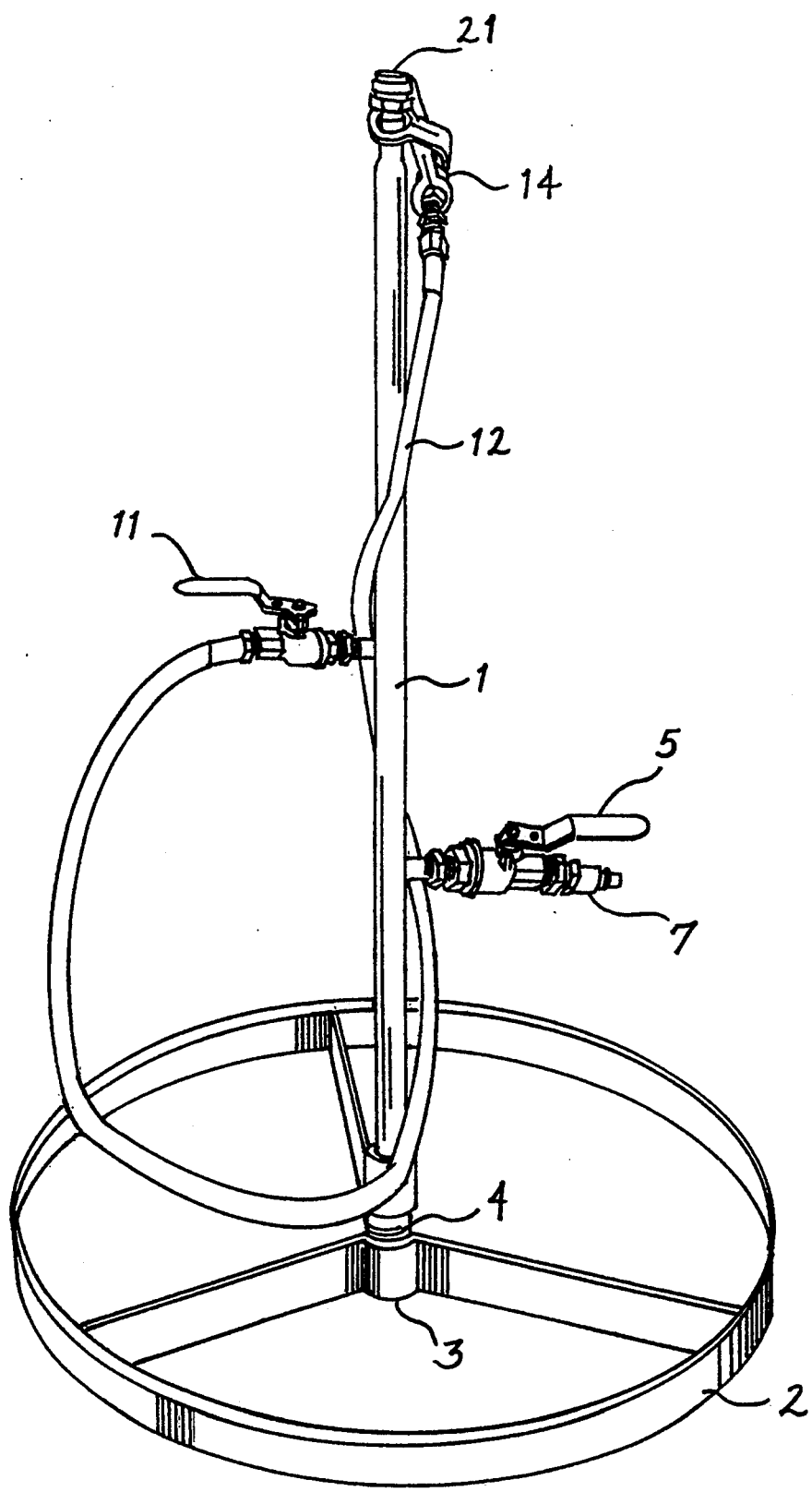
FIG. 1 is a front view of the principal embodiment of the invention.
Figure 2:
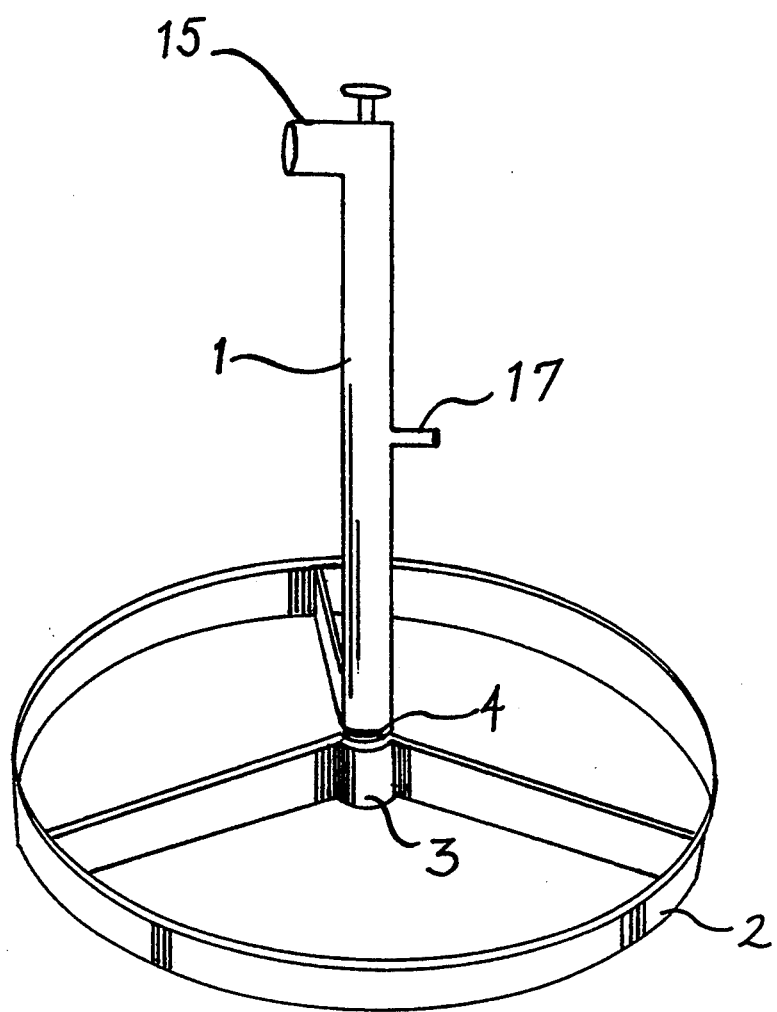
FIG. 2 is a front view of the alternative embodiment.

The invention is a remote propane distribution pole, the height of which is adjustable. The pole comprises a pipe 1 which fits vertically into a base 2. The base 2 may be any shape which provides sturdy support, but preferably has an outer ring with straight pieces forming a Y-shaped pattern as shown in FIG. 1. At the center is a cylindrical coupling 3 which is threaded on the inside.

The pipe 1 has welded to its bottom end a threaded pipe plug 4 which seals the pipe 1 and which screws into the threaded coupling 3 in the base 2. At the top end of pipe 1 is a male disposable propane bottle adapter 21. Instead of a propane bottle which is mounted on this adapter in a conventional pole, a lantern can be mounted. Projecting perpendicularly from pipe 1 is a first shut-off valve 5 having a connection 7 to which a hose can be connected to a propane tank at a remote location. Projecting perpendicularly from the opposite side of pipe 1 is a second shut-off valve 11 which has connected to it an auxiliary appliance hose 12. The auxiliary appliance hose 12 has at its distal end a fitting 14 which fits into an appliance such as an infrared burner or portable stove. FIG. 1 shows the auxiliary appliance hose 12 in the position it would be in when the distribution pole is being stored. In actual use, the hose 12 would extend horizontally from valve 11 to the appliance which is being supplied with propane. The pipe 1 can have additional couplings screwed onto its bottom end to allow the height to be adjusted.

An alternative embodiment of the invention has the same type of base 2 with threaded coupling 3 into which a pipe 1 which has a threaded plug 4 sealing its bottom end can be screwed. In this version, the pipe 1 can be connected directly to a propane tank by means of an angle valve 15 which has a female bulk propane tank fitting. A hose tip 17 projecting from pipe 1 is used to connect the hose to the heating appliance.

I claim:

1. A propane distribution pole which allows propane to be distributed to a heating appliance from a propane tank situated at a remote location, said propane distribution pole comprising:

a base having a threaded coupling projecting upward therefrom;

a pipe sealed at its bottom end by a threaded plug which fits into said threaded coupling of said base to hold said pipe in a vertical position, the height of said pipe being adjustable by affixing additional couplings to the bottom end of said pipe;

and means for connecting said pipe to a propane tank and to a heating appliance.

2. The invention of claim 1 wherein said means for connecting said pipe to said propane tank is a first shut-off valve having a connection for a hose extending to said propane tank, and said means for connecting said pipe to said heating appliance is a second shut-off valve having a connection for a hose extending to said heating appliance.

3. The invention of claim 1 wherein said means for connecting said pipe to said heating appliance is a hose connection, and said means for connecting said pipe to said propane tank is an angle valve having a female bulk propane tank fitting.

* * * * *